United States Patent [19]
Irwin et al.

[11] 3,905,935
[45] Sept. 16, 1975

[54] DYE LAKING RESINS FOR PRINTING INKS

[75] Inventors: Philip G. Irwin, Huntington Twp., Westmoreland County; Thomas J. McNaughtan, Borough of Brentwood, Allegheny County; Joseph G. Roberts, Borough of Pleasant Hills, Allegheny County, all of Pa.

[73] Assignee: Hercules Incorporated, Wilmington, Del.

[22] Filed: Jan. 15, 1973
(Under Rule 47)

[21] Appl. No.: 323,632

[52] U.S. Cl............... 260/33.2 R; 106/22; 106/289; 260/53 R
[51] Int. Cl.²........................................... C08K 5/06
[58] Field of Search......... 260/53 R, 33.2 R, 33 RR, 260/53; 106/20, 21, 22, 289

[56] References Cited
UNITED STATES PATENTS

| | | | |
|---|---|---|---|
| 2,649,382 | 8/1953 | Vesce | 106/289 X |
| 3,020,254 | 1/1962 | Less et al. | 260/38 |
| 3,054,751 | 9/1962 | Blake | 106/289 X |
| 3,216,948 | 11/1965 | Redding | 106/289 X |

OTHER PUBLICATIONS

K. Toi et al., "Synthetic Resins Catalyzing Racemization of Amino Acids" from Chem. Abs. par. 59:7640f. (1963).

*Primary Examiner*—Melvyn I. Marquis
*Assistant Examiner*—S. M. Person
*Attorney, Agent, or Firm*—Buell, Blenko & Ziesenheim

[57] ABSTRACT

This specification discloses laking of dyes for printing inks to make the dyes insoluble in water. A phenol salicylic acid formaldehyde condensation resin is mixed with a dye solution prior to printing.

11 Claims, No Drawings

DYE LAKING RESINS FOR PRINTING INKS

This application relates to the manufacture of printing inks containing dyes. More specifically, it relates to fixing the dyes against bleeding in water.

There is an established market for printing inks which are used upon wrappers and packages having a short shelf life and which are discarded quickly. Typical examples are packages for frozen confections, popcorn, potato chips, ice cream, and other such products which have a fast turnover on the shelf and in which light fastness of the ink is not critical. In such applications it is desirable to use a dye for providing color in the ink in place of pigments which have a substantially greater expense than dyes. Some such inks are alcohol soluble and are known as "flexographic inks." Dyes are also used to impart color to glycol base inks known as "steam set inks" and "letterpress glycol inks".

A difficulty with using dyes in such applications is that the dyes are water soluble. Since there is a high risk that the packaging will be exposed to moisture, e.g. wet hands, the simple use of a water soluble dye in flexographic and glycol base inks is unsatisfactory.

It has previously been proposed to "lake" the dyes i.e. to render the dyes insoluble in water, but soluble in the solvent for the ink. Such dyes in alcohol can be laked by use of tannic acid or methylene disalicylic acid. Both of those suubstances are expensive, however, and their use increases the cost of flexographic inks to the point where they are almost prohibitive. Prior to the present time, rosin modified phenolic condensate resins have been employed to lake dyes in flexographic inks. Those resins have produced good results and are accepted commercially. For glycol base inks, fumaric rosin esters and maleic rosin esters with high acid numbers have been dissolved in diethylene glycol and the dye milled into that solution thereby providing maximum color strength and laking the dye.

We have invented new and useful improvements in dye laking resins. We provide a series of phenol salicylic acid formaldehyde condensation resins. We preferably provide a resin in which phenol is the major constituent and in which salicylic acid and formaldehyde together make up a minor part of the total resin. We prefer to react the constituents together at elevated temperature and at atmospheric pressure until the resin has been formed. We prefer then to strip the resin of unreacted constituents. We presently prefer to provide such a resin having a softening point in the range from about 100°C to about 113°C. Higher softening points may be obtained, and it may be desirable to employ resins with a higher softening point, especially to avoid problems with blocking. We presently prefer the resin to have an acid number ranging from about 65 to 125, and a specific gravity of about 1.2 to 1.3. We prefer the resin to have a viscosity of about 50 to 250 stokes in diethylene glycol and about 1 stoke in ethyl alcohol. We add the resin to a solution of dye and solvent to make a dye ink suitable for printing. The inks are especially advantageous for use on labels, inserts and the like used in contact with or in connection with packaging of food.

Other details, objects and advantages of the invention will become more apparent as the following description of a present preferred embodiment proceeds.

A dye laking resin of the invention (Resin A in Table 1) was prepared by melting together 300 grams USP phenol and 100 grams salicylic acid at 100°C and atmospheric pressure under a nitrogen blanket. 1.5 grams oxalic acid was dissolved in 10 grams of water and the mixture was added to the melted phenol and salicylic acid. Thereafter, 186 grams of 40% formaldehyde solution (74.4 grams formaldehyde) was added to the mixture over a period of one hour and at a temperature in range of 97°–105°. The mixture was then refluxed at 98°C for four hours. Next the resulting resin was steam stripped at 220°C until no salicylic acid remained in the distillate. The resulting resin exhibited the properties shown in Table 1 and was soluble in acetone and ethyl alcohol. Other suitable resins made in a like manner are also shown in Table 1.

TABLE 1

|  | RESINS | | | | |
|---|---|---|---|---|---|
|  | A | B | C | D | E |
| Reactants |  |  |  |  |  |
| Phenol, gm. | 300 | 300 | 300 | 275 | 275 |
| Salicylic Acid, gm. | 100 | 50 | 50 | 25 | 25 |
| Formaldehyde, gm. | 74.4 | 74.4 | 74.4 | 74.4 | 74.4 |
| Oxalic Acid, gm. | 1.5 | 3.0 | 6.0 | 6.0 | 6.0 |
| Water, gm. | 10 | 10 | 10 | 10 | 10 |
| Yield, % | 50.3 | 66.5 | 64 | 70.2 | 70.2 |
| Resin Properties |  |  |  |  |  |
| Softening Point, °C | 109 | 100 | 111 | 106 | 113 |
| Acid Number | 68.7 | 99.2 | 112 | 119.4 | 106.6 |
| Color | 4+ | 2 | 2+ | 2+ | 2+ |
| Specific Gravity | 1.223 | 1.256 | 1.247 | 1.252 | 1.245 |
| Viscosity, stokes |  |  |  |  |  |
| Diethylene Glycol | 154.2 | 81.5 | 231 | 112.3 | 162.5 |
| Ethyl Alcohol | 1 | 1.0 | 1.0 | 0.9 | 1.0 |

The invention may be further illustrated by reference to several examples.

EXAMPLE 1

A series of commonly used dyes were dissolved in a mixture of methyl alcohol, proprietary ethyl alcohol, and ethylene glycol mono ethyl ether sold by Union Carbide Corporation under the name "Cellosolve". The dye and solvent were heated to 120°F to assure that the dye was fully in solution. Resin A was cut to 50 per cent resin non-volatile in 95% proprietary ethanol which was then added to dye solutions to make dye inks. The inks were then drawn down on glassine paper by a No. 6 Meyer bar and placed in a drying oven to flash off the solvent of the ink.

The effectiveness of the resin as a laking agent was tested by placing the printed sheets in distilled water to determine the bleed properties of the dye inks in water after printing. Bleeding was readily observed by noticing a change in the color of the water. The dyes made by using the resin of the invention exhibited properties as good as the known laking resins and better than some which are commercially available. Comparative tests were made using three resins as follows:

Resin A — The resin of the foregoing example.

Resin L — A rosin modified phenolic condensate resin having a high melting point in the order of 135°–145°C and an average density of 8.91 pounds per gallon sold by Ashland Chemical Company under the name "Arochem 455".

Resin M — A maleic acid anhydride modified rosin ester sold by Union Camp under the name "Unirez 757".

In each instance the resin was dissolved in a 50% by weight solution in 95% proprietary ethyl alcohol. A series of dye solutions were prepared by dissolving 10% by weight of the basic dye in a mixture of ethanol, methanol, and Cellosolve. The mixture was heated to effect complete solution and was thereafter cooled. Solvent loss was replaced by adding methanol, the most volatile constituent of the solvent. Resin solutions were then added to dye solutions to form a series of flexographic inks. The inks were drawn down on glassine paper using a No. 6 Meyer bar, and the specimens were placed in an oven at 220°F for 10 seconds to flash off the solvent. The inks embodying the resin of the invention exhibited good gloss. Test strips were then immersed in beakers of distilled water and bleeding was observed by coloring of the water in the beaker. Inks based on a number of common basic dyes were formulated and were tested with the following results shown in Table 2.

Table 3

| Ink Raw Materials | 16 | 17 |
|---|---|---|
| Rhodamine B xtra | 10 | 10 |
| Resin A | 30 | |
| Amberol 820 | | 30 |
| Diethylene Glycol | 60 | 60 |
| TOTAL | 100 | 100 |
| Water Bleed Time | | |
| 24 hours | no bleed | no bleed |
| 48 hours | no bleed | no bleed |
| 72 hours | no bleed | no bleed |
| 96 hours | no bleed | slight bleed |
| 120 hours | no bleed | moderate bleed |

It will be seen from the foregoing that the resin of the invention demonstrates superior performance over a present practice.

TABLE 2

| Ink Raw Materials | 1 | 2 | 3 | 4 | 5 | 6 | 7 | 8 | 9 | 10 |
|---|---|---|---|---|---|---|---|---|---|---|
| Auramine SP conc. dye (1) | 10.0 | | | | | 10.0 | | | | |
| Brilliant Green crystals (1) | | 10.0 | | | | | 10.0 | | | |
| Methyl violet S conc. (1) | | | 10.0 | | | | | 10.0 | | |
| Rhodamine B xtra (1) | | | | 10.0 | | | | | 10.0 | |
| Rhodamine 6 GDN (1) | | | | | 10.0 | | | | | 10.0 |
| Methanol | 10.0 | 10.0 | 10.0 | 10.0 | 10.0 | 10.0 | 10.0 | 10.0 | 10.0 | 10.0 |
| Denatured proprietary ethanol (95%) | 17.0 | 17.0 | 17.0 | 17.0 | 17.0 | 17.0 | 17.0 | 17.0 | 17.0 | 17.0 |
| Cellosolve (2) | 3.0 | 3.0 | 3.0 | 3.0 | 3.0 | 3.0 | 3.0 | 3.0 | 3.0 | 3.0 |
| Resin A | 30.0 | 30.0 | 30.0 | 30.0 | 30.0 | | | | | |
| Resin L | | | | | | 30.0 | 30.0 | 30.0 | 30.0 | 30.0 |
| Resin M | | | | | | | | | | |
| Denatured proprietary ethanol (95%) | 30.0 | 30.0 | 30.0 | 30.0 | 30.0 | 30.0 | 30.0 | 30.0 | 30.0 | 30.0 |
| Total | 100.0 | 100 | 100 | 100 | 100 | 100 | 100 | 100 | 100 | 100 |
| Bleed Time (minutes) (3) dye inks printed on glassine paper | 120 (trace only) | * | * | * | * | 120 (trace only) | * | * | * | * |

| Ink Raw Materials | 11 | 12 | 13 | 14 | 15 |
|---|---|---|---|---|---|
| Auramine SP conc. dye (1) | 10.0 | | | | |
| Brilliant Green crystals (1) | | 10.0 | | | |
| Methyl violet S. conc. (1) | | | 10.0 | | |
| Rhodamine B xtra (1) | | | | 10.0 | |
| Rhodamine 6 GDN (1) | | | | | 10.0 |
| Methanol | 10.0 | 10.0 | 10.0 | 10.0 | 10.0 |
| Denatured proprietary ethanol (95%) | 17.0 | 17.0 | 17.0 | 17.0 | 17.0 |
| Cellosolve (2) | 3.0 | 3.0 | 3.0 | 3.0 | 3.0 |
| Resin A | | | | | |
| Resin L | | | | | |
| Resin M | 30.0 | 30.0 | 30.0 | 30.0 | 30.0 |
| Denatured proprietary ethanol (95%) | 30.0 | 30.0 | 30.0 | 30.0 | 30.0 |
| Total | 100 | 100 | 100 | 100 | 100 |
| Bleed Time (minutes) (3) dye inks printed on glassine paper | 1 | 5 | 10 | 1 | 1 |

(1) Basic dye - E.I. duPont de Nemours
(2) Ethylene glycol mono ethyl ether - Union Carbide Corp.
(3) Test discontinued after 24 hours.
* - No bleeding observed by end of test.

The data in the foregoing tables show that the resin of the invention effectively lakes all of the dyes except Auramine SP. As to that dye, there was only a trace of bleeding. The data further show that the resin of the invention lakes the dyes at least as effectively as other constituents now available and used for that purpose.

EXAMPLE 2

Two ethylene glycol base inks were compared, one ink using Resin A as a dye laking agent and the other ink using a rosin modified maleic resin sold by Rohm & Haas under the name Amberol 820. The two inks were formulated in a similar manner, spread upon Kromekote paper, and dried. The specimens were then immersed in beakers of distilled water with the results shown in Table 3.

While we have illustrated and described a present preferred embodiment of our invention, it is to be understood that we do not limit ourselves thereto, and that our invention may be otherwise variously practiced within the scope of the following claims.

We claim:

1. As a new composition of matter, a phenol salicylic acid formaldehyde condensation resin formed by condensation with oxalic acid and having an acid number from about 65 to 125, a solution viscosity in diethylene glycol of about 50 to 250 stokes, and having a color not darker than about 4+.

2. The resin of claim 1 having a specific gravity of about 1.2 to 1.3.

3. A new resin formed by bringing together phenol, salicylic acid, and formaldehyde and reacting them at an elevated temperature in the presence of an oxalic acidic catalyst, said resin being characterized by a color not darker than about 4+.

4. The resin of claim 3 having an acid number from about 65 to 125 and a solution viscosity in diethylene glycol of about 50 to 250 stokes.

5. The resin of claim 3 having a specific gravity of about 1.2 to 1.3.

6. The method of laking dyes for printing inks which comprises dissolving a water soluble dye and a phenol salicylic acid formaldehyde resin in a solvent, said resin having been formed by condensation with oxalic acid and being characterized by a color not darker than about 4+.

7. The method of claim 6 in which the solvent comprises alcohol.

8. The method of claim 6 in which the solvent comprises diethylene glycol.

9. A new printing ink comprising a basic dye and a phenol salicylic acid formaldehyde condensation resin in solution in a solvent, said resin having been formed by oxalic acid catalysation and being characterized by a color not darker than about 4+.

10. The ink of claim 9 in which the solvent comprises an alcohol.

11. The ink of claim 9 in which the solvent comprises diethylene glycol.

* * * * *